United States Patent
Golding

(10) Patent No.: US 6,170,063 B1
(45) Date of Patent: Jan. 2, 2001

(54) METHOD FOR PERFORMING ATOMIC, CONCURRENT READ AND WRITE OPERATIONS ON MULTIPLE STORAGE DEVICES

(75) Inventor: Richard A. Golding, San Francisco, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/036,617

(22) Filed: Mar. 7, 1998

(51) Int. Cl.$^7$ .................................................. G06F 12/00

(52) U.S. Cl. .......................... 713/502; 711/162; 711/167; 711/147; 711/112; 714/6; 714/12

(58) Field of Search ..................................... 711/167, 112, 711/4, 147, 162; 709/222; 714/12, 6; 713/502, 4

(56) References Cited

U.S. PATENT DOCUMENTS

| | | | |
|---|---|---|---|
| 4,823,310 | 4/1989 | Grand | 364/900 |
| 5,124,987 | * 6/1992 | Milligan et al. | 714/7 |
| 5,410,667 | 4/1995 | Belsan et al. | 395/425 |
| 5,471,631 | 11/1995 | Beardsley et al. | 395/650 |
| 5,481,694 | * 1/1996 | Chao et al. | 711/112 |
| 5,544,345 | 8/1996 | Carpenter et al. | 395/477 |
| 5,574,882 | 11/1996 | Menon et al. | 395/441 |
| 5,581,754 | 12/1996 | Terry et al. | 395/608 |
| 5,603,026 | 2/1997 | Demers et al. | 395/608 |
| 5,604,862 | * 2/1997 | Midgely et al. | 714/6 |
| 5,613,113 | 3/1997 | Goldring | 395/618 |
| 5,655,150 | 8/1997 | Matsumoto et al. | 395/837 |
| 5,671,407 | 9/1997 | Demers et al. | 395/608 |
| 5,689,706 | * 11/1997 | Rao et al. | 707/201 |
| 5,742,792 | * 4/1998 | Yanai et al. | 711/162 |

OTHER PUBLICATIONS

Atul Adya, Robert Gruber, Barbara Liskov, and Umesh Maheshwari. Efficient Optimistic Concurrency Control Using Loosely Synchronized Clocks. Proceedings of 1995 ACM SIGMOD International Conference on Management of Data, pp. 23–34, 1995.

(List continued on next page.)

*Primary Examiner*—Do Hyun Yoo
*Assistant Examiner*—Mehdi Namazi

(57) ABSTRACT

A storage system for storing and retrieving data records. The system includes a storage medium, a controller, and a message log. The storage medium stores data records, the data records being indexed by addresses which specify the location of the data records in the storage medium. The controller receives write messages from processors coupled to the controller. Each write message includes a data segment to be written to the storage medium at a specified address, and coordination information specifying a timestamp, and the addresses of other data records on other storage systems that were written in same write operation. The log stores the write messages prior to the data contained therein being written to the storage medium. Periodically, the controller reads the timestamps of the messages in the log and compares the timestamps to a clock in the controller to determine the message having the oldest timestamp. If the oldest message has a timestamp that is less than the controller's clock value by more than a predetermined amount, the controller writes the data segment contained in the message to the storage medium at the specified address in the message. The controller also receives read messages. Each read message includes information specifying a range of addresses in the storage medium to be read. The controller generates one or more response messages to a read message. Each response message includes an address range in the storage medium that was written in response to a single one of the write messages, the data records stored in the storage medium corresponding to the address range, and the coordination information received in that write message.

7 Claims, 2 Drawing Sheets

OTHER PUBLICATIONS

P. A. Bernstein, V. Hadzilacos, and N. Goodman. Concurrency Control and Recovery in Database Systems. Addison–Wesley, Reading, Massachusetts, 1987.

Kenneth P. Birman and Thomas A. Joseph. Reliable Communication in the Presence of Failures. ACM Transactions on Computer Systems, 5(1):47–76, Feb. 1987.

Richard Andrew Golding. Weak–Consistency Group Communication and Membership. PhD Thesis, published as Technical Report UCSC–CRL–92–52. CISBD, University of California at Santa Cruz, Dec. 1992.

* cited by examiner

METHOD FOR PERFORMING ATOMIC, CONCURRENT READ AND WRITE OPERATIONS ON MULTIPLE STORAGE DEVICES

FIELD OF THE INVENTION

The present invention relates to data storage systems, and more particularly, to a method for reading and writing data across multiple storage devices.

BACKGROUND OF THE INVENTION

To simplify the following discussion, the present invention will be discussed in terms of a data processing system in which multiple computers are connected to multiple storage devices via a network. There are a number of situations in which a computer on the network needs to write data to more than one disk at the same time, and this write operation must be completed before any other computer can access the data records written. Such write operations are often referred to as "atomic writes"

For example, consider a network in which a mirrored copy of a disk is maintained on a separate server to allow recovery from errors and server failures. Each time a computer writes a record to a file on this disk, the same record must also be written to the mirrored disk. If two computers on the network write data to the same record, the network delays can cause inconsistencies in the data storage system. The first computer sends two messages, one to each disk, with its data. Denote the message sent to the first disk by A1 and the message sent to the second disk by A2. Similarly, the second computer sends two messages, B1 and B2 to the first and second disks. Because of network delays, the first disk could receive messages in the order A1 followed by B1 while the second disk receives messages in the order B2 followed by A2. After both disks have been updated, the first disk will have B1 for the record in question, and the second disk will have A2 for the record.

The errors resulting from the scenario discussed above are at least detectable, since the record in question is supposed to be the same of each disk. However, this is not always the case. Consider the case in which a database is spread across multiple disks. An update to the database may require that records on two different disks be updated. Since these records are not mirrors of one another, an inconsistency resulting from network delays, or messages being lost, may not be detectable.

To prevent such errors, any system dealing with multiple disk storage must have two properties. First, either all of the disks must process a message, or none do. Second, if two multi-disk operations are issued concurrently, the resulting disk contents must be the same as would occur if each disk processed its part of the operation in the same order as the other disks.

Three prior art methods have been utilized. The first involves locking the data records to be read or written. Any processor that wants to perform an atomic read or write data first locks the data by sending messages to all of the disks involved. The processor then performs the read or write operation and then unlocks the data. The lock assures that operations occur in the same order on all disks by forcing processors other than the one holding the lock to wait until the lock is released to issue messages involving the affected disk records. This method has a number of problems. First, reading or writing data requires at least three message exchanges on the network between the processor wishing to operate on the data and the disks. Second, each disk must keep track of the locks effecting it and deal with processor failures in which a lock is not released because a processor goes down or has some other error. Third, such systems are subject to "deadlocks" in which a transaction for the lock holder cannot be completed until data is received from a second processor, which is locked out. To prevent such deadlocks, complex systems must be implemented which further reduce the performance of the storage system.

The second method for dealing with disk inconsistencies is to allow writes and reads to occur with a single message and then a check is made for consistency at the end of the processes. In the case of database systems, the consistency check is made during the transaction commitment. If the transaction violates properties discussed above, it must be aborted and re-executed. Such systems perform poorly if conflicts are frequent because the aborting and re-execution is wasteful. In addition, two messages are required per processor in checking for consistency at each operation.

The third method for dealing with disk inconsistencies requires that all participants to a conversation, i.e., all possible processors and disks whose communication overlap, must exchange messages which include timing and coordination information. The overhead in this solution, as measured in time, number of messages, and amount of data that must be transmitted, can be considerable.

Broadly, it is the object of the present invention to provide an improved method for operating a data storage system in which data is updated on multiple storage devices.

It is a further object of the present invention to provide a method that requires fewer messages to be sent than prior art methods for assuring consistency.

It is a still further object of the present invention to provide a method that can correct inconsistent copies of data when messages are lost.

These and other objects of the present invention will become apparent to those skilled in the art from the following detailed description of the invention and the accompanying drawings.

SUMMARY OF THE INVENTION

The present invention is a storage system for storing and retrieving data records. The system includes a storage medium, a controller, and a message log. The storage medium stores data records, the data records being indexed by addresses which specify the location of the data records in the storage medium. The controller receives write messages from processors coupled to the controller. Each write message includes a data segment to be written to the storage medium at a specified address, and coordination information specifying a timestamp, and the addresses of other data records on other storage systems that were written in same write operation. The log stores the write messages prior to the data contained therein being written to the storage medium. The log may be stored in a separate memory or by part of the storage medium. The controller includes a clock. Periodically, the controller reads the timestamps of the messages in the log and compares the timestamps to the clock to determine the message having the oldest timestamp. If the oldest message has a timestamp that is less than the controller's clock value by more than a predetermined amount, the controller writes the data segment contained in the message to the storage medium at the specified address in the message. The controller also receives read messages. Each read message includes information specifying a range of addresses in the storage medium to be read. The controller generates one or more response messages to a read message.

Each response message includes an address range in the storage medium that was written in response to a single one of the write messages, the data records stored in the storage medium corresponding to the address range, and the coordination information received in that write message. In one embodiment of the present invention, the read messages also include a time parameter, and the controller only generates response messages corresponding to write messages having timestamps less than the time parameter.

DETAILED DESCRIPTION OF THE INVENTION

Figure 1:
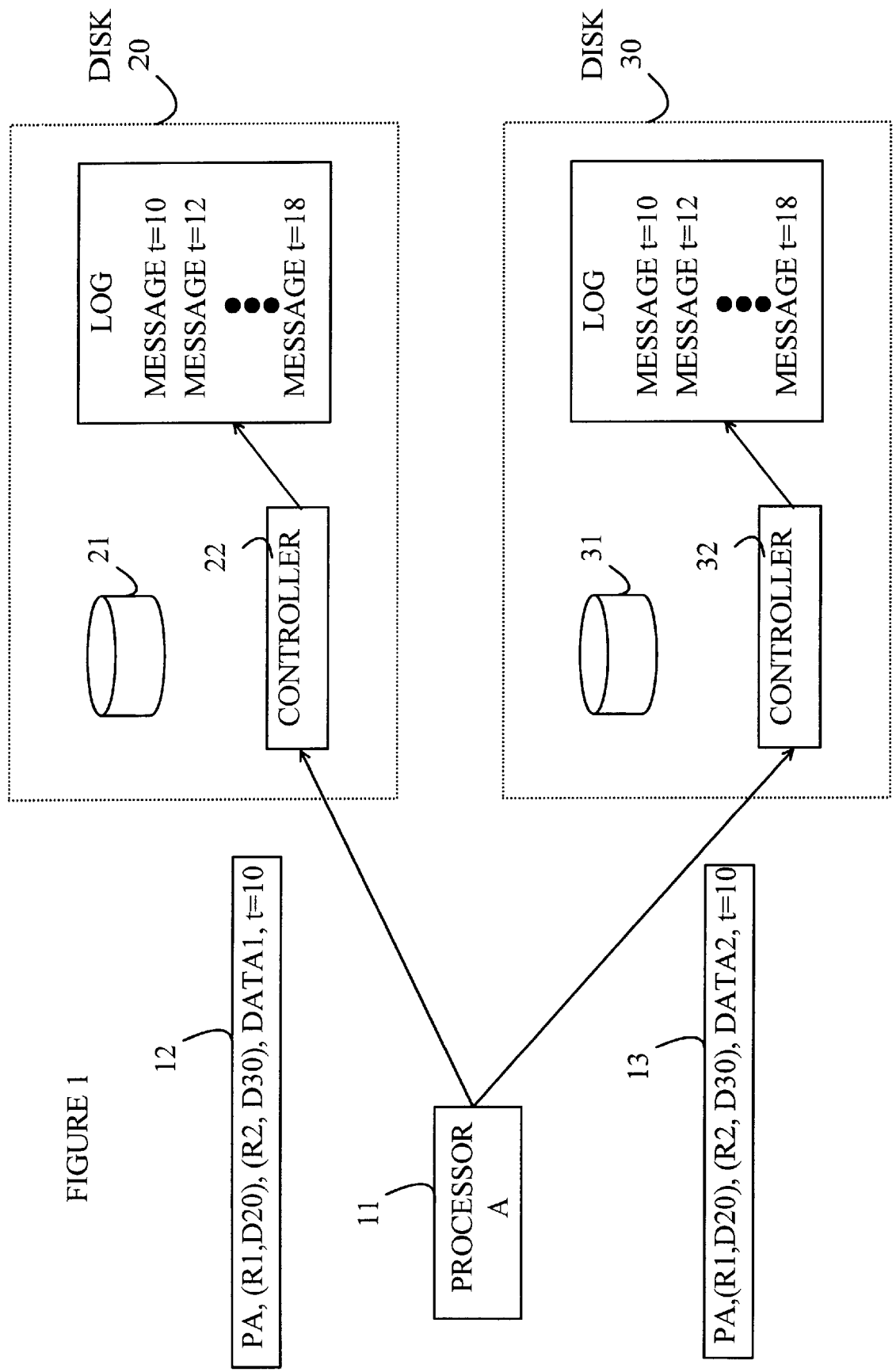
FIG. 1 illustrates an atomic write in a storage system according to the present invention.
Figure 2:
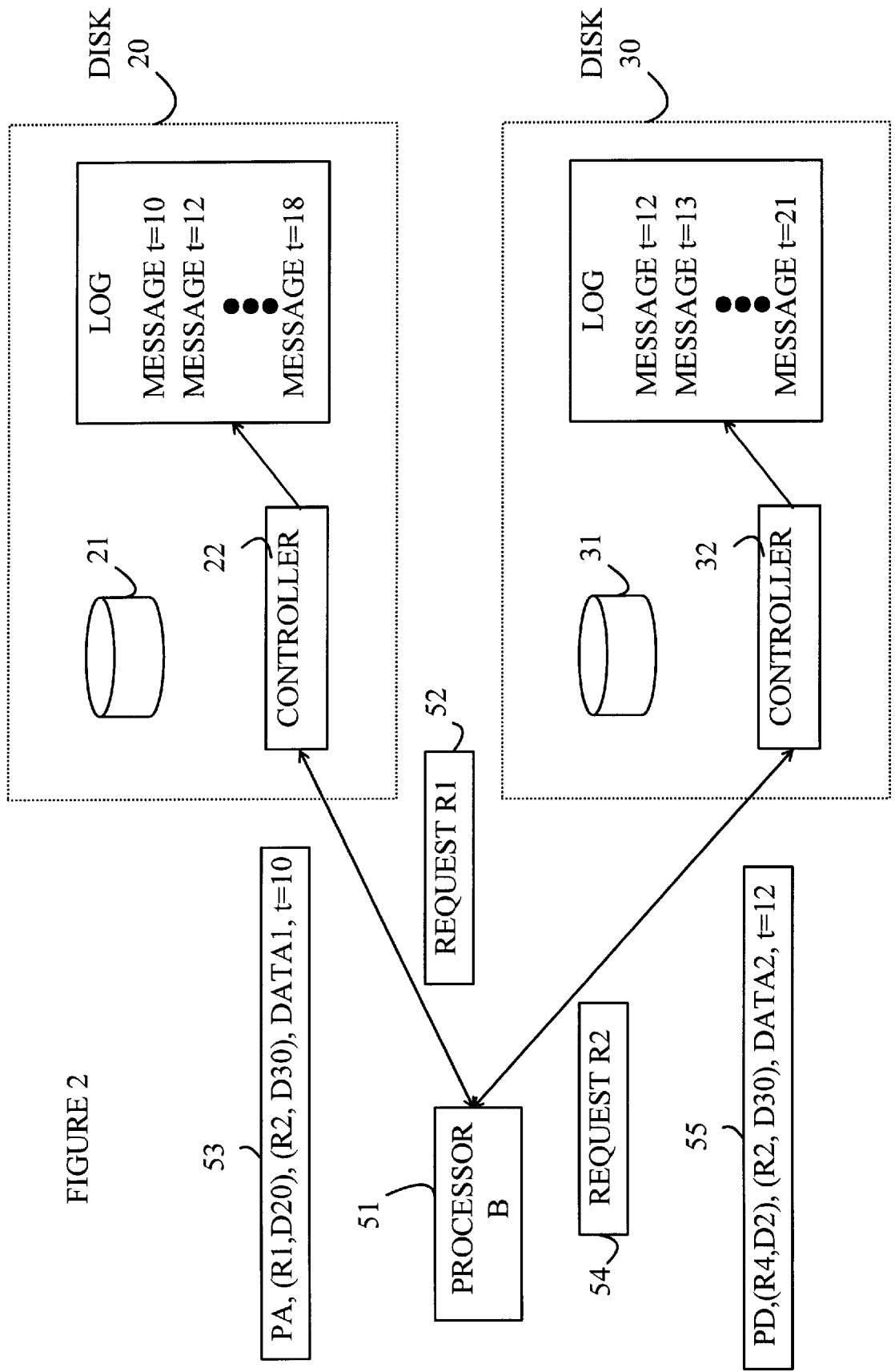
FIG. 2 illustrates a read operation in a storage system according to the present invention.

The manner in which the present invention achieves its advantages may be more easily understood with reference to FIGS. 1–2, which illustrate a write, and read operation directed to two disks 20 and 30. Each disk includes a storage medium shown at 21 and 31 which is used for storing the data records in a manner analogous to that used in conventional disk drives. The location of any given data record is specified by an address on the storage medium. If the storage medium is a conventional disk drive, the address typically specifies a track and sector.

Each disk also has a controller, shown at 22 and 32, respectively. The controllers process messages received by the disks and perform the various storage functions discussed below. To simplify the following discussion, it should be understood that a statement to the effect that a disk performed some operation is equivalent to stating that the controller in the disk performed the operation. Each disk according to the present invention also includes a log for storing write messages received by that disk. The logs are shown at 23 and 33, respectively.

In the simple example shown in FIGS. 1–2, processor A shown at 11 in FIG. 1 writes a first data segment DATA1 to region R1 of disk 20 and a second data segment DATA2 to region R2 of disk 30. For the purposes of this example, each data segment consists of one or more contiguous records that will eventually be written into the storage medium. The write messages generated by processor A, which are shown at 12 and 13, include two additional pieces of data. The first is a time stamp indicating when the transaction that wrote that data occurred. The second includes linkage information identifying the processor that wrote the data and the other disks to which data was written as part of the transaction. This additional information will be referred to as "coordination information" in the following discussion. In the example shown in FIG. 1, the write messages were generated at t=10.

By including timing information in the coordination information included in the write commands sent to disks, each disk can independently arrive at a consistent order for processing the write commands while requiring only a single message exchange. As will be discussed in detail below, this same timing and coordination information can be used on read operations to detect inconsistencies between disks and to resolve the inconsistencies to generate a consistent response.

Upon receiving a write message, each disk stores the message in the log associated with that disk. After a sufficient time interval has elapsed, the data in the logged message is stored in the storage medium. As will be explained in more detail below, after the data is written to the storage medium, the coordination information may or may not be permanently stored.

Refer now to FIG. 2. Some time after processor A has sent the write message discussed above, processor B shown at 51 requests the data stored at region R1 on disk 20 and region R2 on disk 30 by sending read messages to the disks as shown at 52 and 54. For the purposes of this discussion, it will be assumed that the coordination data corresponding to the last writes to these regions is still stored in the respective disks. Disk 20 returns the message shown at 53 indicating that data record it has for R1 was written in by a message bearing a timestamp of t=10 sent by processor PA and that the write operation that generated this message also wrote data to R2 on D30.

There are three possible messages that disk 30 could return. First, it could return the message shown at 13 in FIG. 1. This would be a consistent data entry, since it indicates that the last write to disk 30 effecting region R2 was in fact the atomic write shown in the message returned by disk 20.

The second possibility would be that disk 30 returns a message with a later timestamp than that returned by disk 20. This is the message shown at 55 in FIG. 4. This would also be a consistent data entry. Such a situation would arise from the case in which another processor, i.e., PD in this case, updated R2 on disk 30 without updating R1 on disk 20. In the message shown at 55, processor PD updated R2 on disk 30 and region 4 on disk 20 in an atomic write message bearing the timestamp t=12. The message also includes the data, DATA2, provided in that write for region R2. Such a situation can occur in a database in which the database records are spread between the disks.

The third possibility would be that disk 30 returns a message with an earlier timestamp than t=10. This would clearly indicate an inconsistent data situation, since message 53 indicates that R2 was updated at t=10. Hence, this message must have been lost.

The preceding simple example involved only the situation in which two disks were involved and all of the region requested by the second processor from each disk had been written in a single write operation. In general, the coordination data includes a list all of the regions that are being updated by the processor on the other disks in the system. In addition, any given region may have been updated in pieces by different messages.

Having described the manner in which the present invention operates with respect to the above simple example, the write and read protocols will now be discussed in more detail for the more general case.

The write begins when the processor sending the update to the disks obtains a timestamp t from its local clock. Each processor's local clock must be synchronized with the clocks of the other processors on the network to within some maximum allowed time difference $\Delta t$.

Next, the sending processor sends a write request message to each disk that is to be updated. Denote the set of regions on the disks to be updated by R. The processor sends a message to each disk d that stores data that is part of R. The message that is sent to disk d contains the coordination information and the data to be written to disk d. The coordination information consists of the timestamp t, a unique identification code identifying the processor sending the message, and a list of the entire set of regions, R, that is being updated in this write. Each disk that receives a message without error sends an acknowledgement message so indicating. The sending processor collects the acknowledgment messages returned by the disks. If all of the acknowledgement messages are positive, the processor discards its copy of the data and the process ends. If some of the returned acknowledgement messages are negative, or not all of the messages are received within a predetermined period of time, the processor retries the protocol from the beginning.

Each disk receiving a message compares the message timestamp t to the disk's local clock c to determine if the message was sent within a reasonable time frame. If the message is to old, the receiving disk will discard the message. Similarly, if the message is too new, there could be a timing synchronization problem. Hence, the recipient disk tests to see if timestamp on the message is more than T seconds older than c (that is, c>t+T). Similarly, the recipient disk checks for a message that is too new (t>c+Δt). Here Δt is the maximum allowed difference among clocks. If the timestamp fails either of these two tests, the disk sends a negative acknowledgment back to the sender and discards the message.

If the timestamp passes the above test, the disk places the message in a log, which is preferably stored in non-volatile storage associated with the disk's controller. The messages in the log are ordered by timestamp. If two messages have the same timestamp, the identification code of the sending processor is used to break the tie. Upon accepting the message, the disk sends a positive acknowledgment message back to the sending processor.

Each disk periodically reviews the messages in its log. If the disk finds messages in the log that are at least T seconds old, the disk processes the messages in the order of the timestamps on the messages by writing the associated data to the appropriate location on disk, then discarding the message. As will be explained in more detail below, the coordination information may or may not be retained, depending on the particular embodiment of the present invention being implemented. If the coordination information is to be retained it is preferably stored on the disk, either in the same area as the data or in a separate area reserved for this information.

The parameter T is used to determine when it is safe to write the messages' data to the storage media. T is chosen to be sufficiently long to guarantee that no older messages could still be received. As long as the network delivers messages reliably and in a timely fashion, T can be selected to be a little longer than the time required to deliver a message plus the maximum drift between clocks. However, it should be noted that utilizing a value larger than this minimum only impacts the size of the log, which must now be somewhat larger.

The read protocol reads a set of regions R from a set of disks D. As mentioned above, to simplify the discussion, it will be assumed that one read operation only involves one contiguous region from any one disk. However, it will be obvious to those skilled in the art from the proceeding discussion that the protocols can handle reads involving more than one region from each disk by repeating the protocol for each contiguous part of the region. The goal of the read protocol is to provide the processor requesting the data either with a consistent set of data, or an inconsistent set of data and an indication that the data is inconsistent.

A processor wishing to read a region of a disk, sends a read request message to the disk, and the disk replies with both the data and the coordination information recorded in the disk's log when that data was received, if that information still exists. The processor then uses the returned coordination information to crosscheck whether the disks' replies are consistent with each other.

The processor wishing to read data sends a request message to each disk. The request message contains only the region that is to be read from that disk. Each disk receiving a request message for the data stored for a region, r, consults its log to find the newest message, n, that contains data for that region. That message, if it exists, may cover only part of the region requested. If message n covers only part of the region, region r is split into two, or possibly three, regions, the one covering the portion of the region found in message n and the remaining portions of the region. In the worst case, the region covered by message n can provide a portion of the data in the middle of region r, and hence, two fragments remain, one on each side of the region covered by message n. This step is then recursively applied on the remaining fragments until all messages related to region r are found. Each message is returned. Hence, the requesting disk receives one or more messages. Each message provides a part of the data requested and the coordination information that was received in the messages that provided that part of the data.

If no message is present for a region, the data stored on the disk for that region is returned with a default message indicating that no log records exist. For example, the timestamp on the message can be set to zero, and the list of other disk regions written is then set to indicate that no other disk regions were written.

The processor checks each response message for consistency. In general, the response message for the $k^{th}$ region includes a data block $W_k$ having the data stored on the disk for region $r_k$, a timestamp, $t_k$, and a list other regions, $r_j$, for j=1 to $N_k$, that were written as part of the atomic write in which $r_k$ was written. If one of the other regions is also a region the processor is attempting to read in the current operation, the processor will also have received the data for this region and its associated coordination information in a response to a read message received from the appropriate disk.

If one of the other regions is not part of this read, the processor has two choices. First, the processor can ignore the region. That is, the processor assumes that the regions were correctly written. Second, the processor can specifically check the other regions by sending the appropriate read messages to the disks containing these messages. Typically, the first option will be taken, as this is the most efficient from the processor's point of view, since it is not interested in the actual data in that region.

When the processor has collected all of the response messages relating to the coordination information returned with the message for $r_k$, the processor compares the timestamps in each of these messages. Consider the response messages corresponding to region $r_j$. There are three possibilities, $t_k < t_j$, $t_k = t_j$, or $t_k > t_j$. If $t_k \leq t_j$, the response for $r_j$ is consistent with that for $r_k$. The case in which $t_k < t_j$ indicates that $r_j$ was updated in a transaction subsequent to the atomic write in which $r_k$ was updated. This situation can occur in multiple disk writes such as those that occur when a database is spread across several disks. If $t_k > t_j$, there is clearly an inconsistency between $r_k$ and $r_j$, since the message from the atomic write that updated $r_k$ indicated that $r_j$ was also updated at the same time, yet that update message was obviously not processed by the disk on which $r_j$ was stored.

If an inconsistency is found, the processor can attempt to repeat the operation. One reason for the inconsistency could be a delay in the network that resulted in the missing message not yet being recorded, i.e., the message is still in transit. In this case, a repeated read at a later time may find the message.

If the inconsistency exists and the multiple disk records are part of a redundant storage scheme, the appropriate error correction routines can be called to correct the storage system. For example, in mirrored disk systems, the other copy of the data can be used to update the disk that missed its previous update message.

It should be noted that during the period of time in which a message is stored in a disk's log, there are two copies of the data for the relevant region of the disk present in the disk. The first copy is the old data stored on the disk, and the second is the new data that is stored in the log with the message. The length of time over which this situation exists depends on the time T discussed above with respect to the write protocols.

In one embodiment of the present invention, T is chosen sufficiently long to allow a processor to read either copy of the data. In this embodiment, a processor requests data as of a certain time by including a timestamp in the read message. In this case, only data that is older than the timestamp is returned. This embodiment of the present invention is useful in recovering from inconsistencies in which there is not a redundant copy of the data available. For example, consider the case in which a database is spread across a number of disks and a processor crashes in the middle of a series of write messages. Some of the disks will have received their messages while others will not. As a result there is a permanent inconsistency. Reading the data as it existed prior to the crash allows other processors to roll back the partial write so that the data is consistent, all be it, out of date. The crashed processor can then re-write the data when it is returned to operation. In effect, the "crash" is moved back to a time prior to the attempted atomic write that caused the inconsistency.

The above-described embodiments of the present invention utilize a log for storing the coordination information. The log may be stored separately or as part of the data records. For example, the log may be stored in some form of local non-volatile RAM or in a separate area of the disk. Alternatively, the log may be stored in sector headers intermixed with the data. In this last alternative, there will only be one copy of the data for each region at any time, and the log information will be permanently maintained for each sector.

A less than ideal network may deliver messages in an order that does not match the order in which the messages were generated. Hence, in the preferred embodiment of the present invention, only the newest data is written to the disk. If the disk receives a message having data for a region that is older than the data already stored in that region, the data is ignored. For example, consider the case in which a message updating a disk region is delayed in the network for an extended period of time. In the meantime, a new message from a different processor updates that region. When the delayed message finally arrives, it will have a timestamp that is older than that stored in the log entry for the data stored on the disk. In this case, the older data is merely ignored.

It should be noted that a message may contain data for a number of sectors on the disk, and hence, the message may represent data that is newer than that stored for some of the sectors and older than stored for others. In this case, only the newer data is written to the disk, and the log is updated accordingly.

The read protocol discussed above may return much more coordination information than the processor making that read request requires. The disk does not know what other data ranges are of interest to the processor; hence, the disk must return all of the data ranges that are pertinent to the read. The amount of coordination information returned can be reduced by modifying the read message to include a list of all ranges being read as part of this read request. The disk can then restrict the returned coordination information to data related to those ranges. This embodiment of the present invention is particularly usefull when data with complex overlap patterns is written often.

As noted above, the lifetime of the coordination information depends on the particular embodiment of the present invention being implemented. The coordination information may be discarded when the data is written to disk or it may be stored permanently with the data when the data is written to the disk. Embodiments in which the coordination information is stored with the data have the advantage of allowing inconsistencies to be detected after the log entries are cleared. However, they impose an overhead on the system both in terms of storage for the coordination information and overhead for checking for inconsistencies.

If the network is "well-behaved", the coordination information may be erased after some predetermined time period. An ideal network never losses messages and the never spontaneously generates or mutates packets. In particular, the network does not partition. Furthermore, a well-behaved network delivers message in FIFO order and network transmission time is bounded and small. In addition, the processors and disks have clocks that are synchronized to within a relatively small margin of error. Finally, processors do not perform concurrent, overlapping read or write operations. A well-behaved network is one that is nearly ideal.

In a well-behaved network, the disks need only maintain the log entries until the data is actually written to the disk and some time period has elapsed. In this case, coordination information is only returned for data that has log entries, i.e., data that may be in the process of being written. Once the data becomes stable, the data log entries are purged and reads to that data do not return coordination information. Embodiments in which the disk tests the consistency of the data prior to purging the log may also be constructed without deviating from the teachings of the present invention.

Some data storage systems utilize a virtual volume that appears as a single linear sequence of bytes from 0 to n, even though the data is actually stored across multiple physical disk drives. In such systems, the operating system that performs the translation from the virtual address to the actual physical disk has the mapping table from virtual to physical disk drive addresses and this disk layout remain constant. Accordingly, the linkage information can be simplified by specifying only the virtual address ranges written in each atomic write, since only one virtual range is written at a time. When a processor reads the data, it can perform all of the consistency checks in terms of the virtual addresses.

The above-described embodiments of the present invention have utilized a storage medium which is a conventional disk drive. However, it will be obvious to those skilled in the art from the preceding discussion that the present invention may utilize any form of storage medium for storing the data segments.

Various modifications to the present invention will become apparent to those skilled in the art from the foregoing description and accompanying drawings. Accordingly, the present invention is to be limited solely by the scope of the following claims.

What is claimed is:

1. A storage system for storing data records, said storage system comprising:

a storage medium for storing data records, said data records being indexed by addresses which specify the location of said data records in said storage medium;

a controller for receiving, write messages from processors coupled to said controller, each write message including a data segment to be written to said storage medium at a specified address, and coordination information specifying a timestamp, and the addresses of other data records on other storage systems that were written in the same write operation, said timestamp specifying the time at which said processors sent said write messages to said controller a log for storing said write messages;

wherein said controller further comprises a clock and wherein said controller periodically reads said timestamps of said write messages in said log and compares said timestamps to said clock to determine said message having the oldest timestamp and wherein said controller writes said data segment contained in said message having the oldest timestamp to said storage medium at said specified address if said timestamp is less than said clock by more than a predetermined amount.

2. The storage system of claim 1 wherein said controller also writes said coordination information to said storage medium when said controller writes said data segment to said storage medium.

3. A storage system for storing data records, said storage system comprising:

a storage medium for storing data records, said data records being indexed by addresses which specify the location of said data records in said storage medium; and a controller for receiving write messages from processors coupled to said controller, each write message including a data segment to be written to said storage medium at a specified address, and coordination information specifying a timestamp, and the addresses of other data records on other storage systems that were written in the same write operation, said timestamp specifying the time at which said processors sent said write messages to said controller, wherein said controller also receives read messages, each read message comprising information specifying a range of addresses in said storage medium and wherein said controller generates one or more response messages to one of said read messages, each response message comprising an address range in said storage medium that was written in response to a single one of said write messages, the data records stored in said storage medium corresponding to said address range, and the coordination information received in that write message.

4. A method for causing a storage system to store and retrieve data across multiple storage devices each of said storage devices comprising:

a storage medium for storing data records, said data records being indexed by addresses which specify the location of said data records in said storage medium;

a controller for receiving write messages from processors coupled to said controller, each write message including a data segment to be written to said storage medium at a specified address, and coordination information specifying a timestamp, and the addresses of other data records on other storage systems that were written in the same write operation, said timestamp specifying the time at which said processors sent said write messages to said controller; and a log for storing said write messages.

said method comprising the steps of:

causing a processor wishing to store a data set comprising a plurality of records to be stored on one or more of said storage devices in said storage system to send a write message to each storage device that is to store a portion of said data set each write message comprising said portion of said data set that is to be stored on that storage device, and coordination information specifying a timestamp, and the addresses of said portions of said data set that were included in said write messages sent to other storage devices in said storage system;

causing said controller in each of said storage devices to store each write message received by that storage device to be stored in said log included in said storage device; and causing each controller in said storage system to periodically read said timestamps of said write messages in said log included in that storage device, to compare said timestamps to determine said message having the oldest timestamp, and to write said portion of said data set contained in that write message to said storage medium at said specified address if said timestamp indicates that said message has been stored in said log for more than a predetermined amount of time.

5. A method for causing a storage system to store and retrieve data across multiple storage devices each of said storage devices, comprising:

a storage medium for storing data records, said data records being indexed by addresses which specify the location of said data records in said storage medium;

a controller for receiving write messages from processors coupled to said controller, each write message including a data segment to be written to said storage medium at a specified address, and coordination information specifying a timestamp, and the addresses of other data records on other storage systems that were written in the same write operation, said timestamp specifying the time at which said processors sent said write messages to said controller; and a log for storing said write messages, said method comprising the steps of:

causing a processor wishing to store a data set comprising a plurality of records to be stored on one or more of said storage devices in said storage system to send a write message to each storage device that is to store a portion of said data set each write message comprising said portion of said data set that is to be stored on that storage device, and coordination information specifying a timestamp, and the addresses of said portions of said data set that were included in said write messages sent to other storage devices in said storage system; and causing said controller in each of said storage devices to store each write message received by that storage device to be stored in said log included in said storage device, wherein a processor wishing to retrieve a data set from said storage system sends a read message to each storage device in said storage system having a portion of said data set stored therein, each read message comprising information specifying a range of addresses in said storage medium and wherein each controller receiving one of said read messages generates one or more response messages to that read message, each response message comprising an address range in said storage medium that was written in response to a single one of said write messages, the data records stored in said storage medium corresponding to said address range, and the coordination information received in that write message if said coordination information is still stored in that storage device.

6. The method of claim 5 wherein said processor wishing to retrieve said data set compares said timestamps included in said response messages to determine if said data set is invalid because a write message related to that data set was not properly recorded by one of said storage devices.

7. The method of claim 5 wherein said read messages further comprise a time parameter and wherein said controllers only generates response messages corresponding to write messages having timestamps less than said time parameter.

* * * * *